ANDRE-JEAN C. BERTEAUD ET AL

HIGH FREQUECY POWER LIMITER UTILIZING A FERROMAGNETIC THIN LAYER

Original Filed May 6, 1966

United States Patent Office 3,534,276

Patented Oct. 13, 1970

3,534,276

HIGH FREQUENCY POWER LIMITER UTILIZING A FERROMAGNETIC THIN LAYER

Andre-Jean Charles Berteaud, 30 Ave. de Bellevue, 92 Bourg-la-Reine, France; Hubert Marcel Joseph Pascard, 12 Rue des Bigots, 92 Meudon, France; and Roger Jean Joseph Vautier, 83 Blvd. du Marechal Joffre, 92 Bourg-la-Reine, France Continuation of application Ser. No. 548,148, May 6, 1966. This application June 26, 1969, Ser. No. 841,672

Claims priority, application France, May 17, 1965, 17,319

Int. Cl. H01p *1/32;* H03g *11/04*

U.S. Cl. 333—17 3 Claims

ABSTRACT OF THE DISCLOSURE

A power limiting device for high frequency electromagnetic waves including a thin ferromagnetic layer parallel to the magnetic field produced by the electromagnetic waves, and means for producing a continuous magnetic field having a value lower than the one corresponding to the maximum absorption of power by the ferromagnetic layer and corresponding substantially to the maximum absorption of power at a subsidiary absorption point parallel to the ferromagnetic layer and perpendicular to the magnetic field of the incident waves.

This is a continuation of Ser. No. 548,148, filed May 6, 1966.

The present invention relates to devices capable of limiting the power of high frequency electromagnetic waves (that is to say of a frequency higher than 1 mHz. and preferably higher than 1000 mHz.) transmitted from the input to the output of such a device, said power being preferably variable and its ratio of transmission being the smaller as this power is higher. The present invention is more especially concerned with devices of this kind used for protecting receivers against the effect of powerful pulses produced by transmitting systems in radars having the same antenna for transmission and reception.

The chief object of our invention is to provide a device of this kind which is better adapted to meet the requirements of practice than those used up to this time.

Our invention consists chiefly in providing the devices in question with at least one ferromagnetic thin layer, which may be electricity conducting, disposed parallel to the magnetic field of the wave to be controlled and with means for producing a continuous magnetic field parallel to this layer and perpendicular to the field of said magnetic waves to magnetize said layer, the value $H_s$ of this continuous magnetic field being lower than that, $H_r$, corresponding to the maximum absorption of power by said layer (ferromagnetic resonance) and being chosen in such manner as to correspond to the maximum absorption of power (or at least to a value close to this maximum) of a subsidiary absorption which takes place, for high levels of power of the electromagnetic waves to be controlled, with values of the continuous magnetic field lower than $H_r$.

Figure 1:
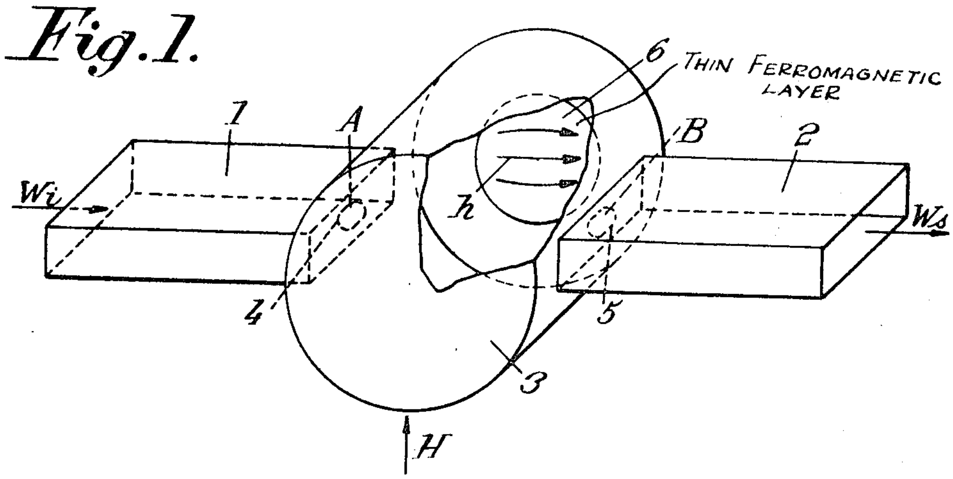
Figure 2:
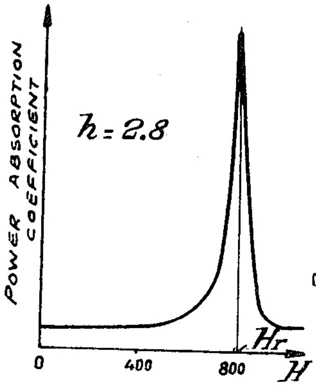
Figure 3:
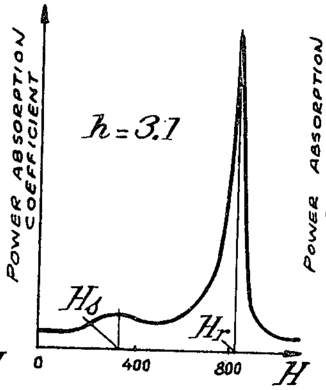
Figure 4:
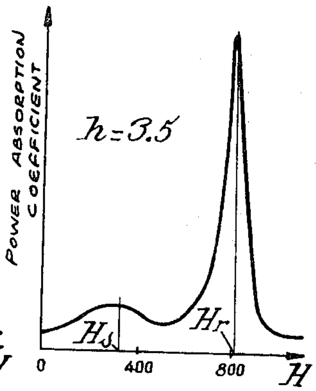
Figure 5:
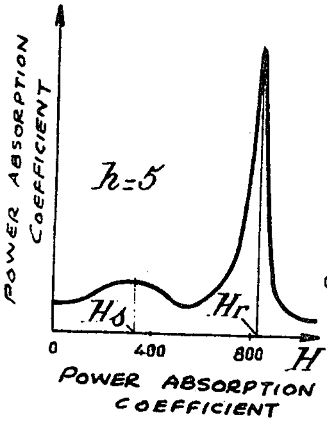
Figure 6:
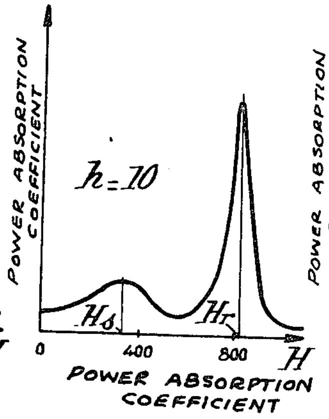
Figure 7:
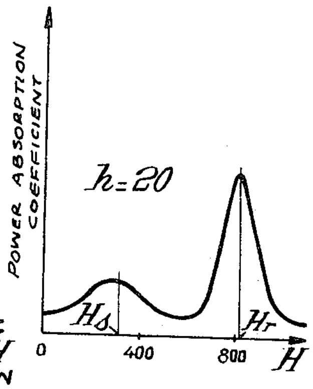

A preferred embodiment of the present invention will be hereinafter described with reference to the appended drawings, given merely by way of example, and in which:

FIG. 1 is a diagrammatic perspective view, with parts cut away, of a power limiting device according to this invention;

FIGS. 2 to 7 inclusive show curves explanatory of the operation of this limiting device.

As diagrammatically shown by FIG. 1, the object of the present invention is to limit the power of a high frequency electromagnetic wave between a point A reached by the incident wave W*i* travelling through a waveguide 1 and a point B from which the outgoing wave travels through another waveguide 2.

We interpose between points A and B a cell 3 communicating with said respective points through suitable openings 4 and 5 which may be adjustable, being for instance limited by iris diaphragms.

We apply upon at least one of the inner walls of cell 3 at least one thin ferromagnetic layer 6 parallel to the magnetic field $h$ of the electromagnetic waves in the portion of cell 3 where this layer is placed.

Thin layer 6 is magnetized by means of a continuous magnetic field H parallel to this layer and perpendicular to field $h$ and produced, for instance, by coils, not shown by the drawing, through which a direct current is made to flow.

This continuous magnetizing field is given a value $H_s$ lower than that, $H_r$, corresponding to the maximum absorption of power by the layer, that is to say to its ferromagnetic resonance, and which is related to the frequency $f$ of the waves by a formula of the following type:

$$2\pi=\gamma\sqrt{H_r(H_r+4\pi M)}$$

wherein $\gamma$ is the gyromagnetic constant of the material of the layer and $4\pi M$, is the saturation magnetization of this material.

This "lower" value $H_s$ is chosen in such manner as to correspond to the maximum (or to a value close to the maximum) of a subsidiary absorption which exists for low magnetizations (lower than $H_r$) when the power of the waves to be controlled reaches a high level.

As a matter of fact it happens that, contrary to what takes place for the maximum degree of the main or resonance absorption, the maximum degree of this subsidiary absorption increases together with the power of the waves to be controlled, which is desired in the case of power limiters.

This curious and unforeseen phenomenon for thin ferromagnetic layers is clearly visible on the curves of FIGS. 2 to 7.

On these curves the continuous magnetizing field H, expressed in oersteds, is plotted in abscissas whereas the power absorption coefficient expressed in arbitrary units, is plotted in ordinates.

The conditions corresponding to said six curves differ from one another only by the gradual increase of the power level of the incident waves (which level is indicated in oersteds in intensity of field $h$).

It will be seen that, whereas the maximum of the main absorption (corresponding to $H_r$) gradually decreases, the absorption curve forms an upward projection of greater and greater value for a value $H_s$ of the polarizing field substantially lower than $H_r$.

As above indicated, the fact that this projection gradually increases, is favorable because it indicates that the power absorption is the greater as the level of this power is itself greater. It is this property, quite new in the case of thin ferromagnetic layers, which is used according to the present invention.

It should be reminded that it has already been proposed to use, for limiting the power, an analogous subsidiary power absorption phenomenon which takes place in the case of ferrites.

But use of this phenomenon was not found satisfactory in practice for the following reasons.

The time of response of the limiters was too high, which had the very serious drawback of transmitting the beginning of the powerful pulses contained in the incident waves. Furthermore, it was very difficult to cool down ferrite, due to its massive structure and to its bad heat conductivity.

In the present case, on the contrary, the time of response of the limiter is negligible and the thin layer complies in a perfect manner with the conditions necessary for the evacuation of heat (large area and good heat conductivity).

The degree of power limitation that may be obtained according to the present invention varies with the thickness, the nature, the size and the direction of the thin layer. Of course, it is possible to use several such layers having complementary characteristics to improve the total efficiency of the limiter.

As a rule, the thickness of each layer ranges from 100 to 100,000 angstroms, preferably from 500 to 5,000 A.

Merely by way of indication we will give the numerical values of the curves of FIGS. 2 to 7 corresponding to experiments made in the following conditions:

Cell consisting of a cylindrical cavity having brass walls of the type of that shown by FIG. 1, with flat ends of 27 mm. diameter, resonating in the $TE_{111}$ mode and the overtension of which under load averages 1500;

Incident wave produced by a magnetron and oscillating in $TE_{01}$ fashion;

Frequency of this incident wave: 9,365 mHz.;

Peak power in the cavity: from 0 to 2.9 kw., which corresponds to a field $h$ ranging from 0 to 60 oe.;

Thin layer constituted by a deposit of Permalloy (alloy of 83% of Ni and 17% of Fe) atomized under vacuum over a flat glass support in the form of a circular disc, said support being then applied upon one of the ends of the cavity in such manner that the disc is directly in contact with this end wall and centered thereon, this disc having a diameter of 10 mm. and a thickness of 1000 angstroms;

Value of the polarizing field H parallel to the thin layer and perpendicular to $h$:300 oersteds.

Our invention also applies to the case where the cell is made to include flat or slightly curved surfaces of great area parallel both to the magnetic field $h$ of the waves to be controlled and to the applied continuous field H, these surfaces being coated with at least one thin ferromagnetic layer.

Our invention also includes the case where the cell, instead of consisting of a resonant cavity with a rather narrow frequency range of operation, would be constituted by a cell having a wider frequency range, for instance of the type called "progressive wave type."

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What is claimed is:

1. A device for limiting the power of high frequency electromagnetic waves which comprises, in combination, cell means having an input and an output for the transmission therethrough of said waves, a ferromagnetic thin layer in said cell means extending substantially in a plane parallel to the magnetic field of said waves, and means for producing a continuous magnetic field parallel to said plane and perpendicular to the magnetic field of said waves to magnetize said layer, the value of said continuous magnetic field being lower than that corresponding to the maximum absorption of power by said layer and being at least substantially equal to the maximum of a subsidiary absorption of power produced, for high power levels of the waves to be controlled, by values of the continuous magnetizing field lower than that corresponding to the maximum absorption of power by said layer.

2. A process for limiting the power of high frequency electromagnetic waves being transmitted through a power limiting device, comprising (1) transmitting said waves through a cell means in such manner that the magnetic field of said waves is parallel to a thin substantially planar ferromagnetic layer supported in said cell means; and (2) exposing said waves to a continuous magnetic field positioned parallel to said ferromagnetic layer and perpendicular to the magnetic field of said waves, the value of said continuous magnetic field being lower than the maximum absorption of power by said layer and corresponding substantially to a maximum absorption of power of said layer at a subsidiary absorption point.

3. A device for limiting the power of electromagnetic waves of a preselected, high frequency which comprises, in combination, cell means having an input, an output and a range of operation adapted for the transmission therethrough of said waves, a substantially planar ferromagnetic layer of thickness in the range between about 100 angstroms and about 100,000 angstroms mounted in said cell means extending parallel to the magnetic field of said waves and adapted to exhibit a substantial subsidiary absorption of power of said waves at high power levels of said waves, said subsidiary absorption being produced by a continuous magnetizing field lower than that corresponding to the maximum absorption of power by said layer, and means for producing a continuous magnetic field parallel to said layer and perpendicular to the magnetic field of said electromagnetic waves to magnetize said layer, the value of said continuous magnetic field corresponding closely to the maximum of said subsidiary absorption.

References Cited

UNITED STATES PATENTS 3,113,278 12/1963 Okwit ............ 333—24.2

OTHER REFERENCES

Comly et al., Spin-Wave Instabilities in Magnetic Thin Films, Journal of Applied Physics, vol. 34, No. 4 (part 2), April 1963, pp. 1145, 1146.

J. H. E. Griffiths, Anomalous High-Frequency Resistance of Ferromagnetic Materials, Nature, Nov. 9, 1946, pp. 670, 671.

PAUL L. GENSLER, Primary Examiner

U.S. Cl. X.R.

333—24.2

UNITED STATES PATENT OFFICE
CERTIFICATE OF CORRECTION

Patent No. 3,534,276 Dated October 13, 1970

Inventor(s) Andre-Jean Charles Berteaud et al

It is certified that error appears in the above-identified patent and that said Letters Patent are hereby corrected as shown below:

Column 1, lines 34 and 35, "mHz" should read -- MHz --.

Column 2, line 21, in the formula, "$2\pi$" should read -- $2\pi f$ --.

SIGNED AND SEALED

FEB 23 1971

(SEAL)
Attest:

Edward M. Fletcher, Jr.
Attesting Officer

WILLIAM E. SCHUYLER, JR
Commissioner of Patents

FORM PO-1050 (10-69)

USCOMM-DC 60376-P69
☆ U.S. GOVERNMENT PRINTING OFFICE : 1969 O—366-334